Patented Feb. 14, 1928.

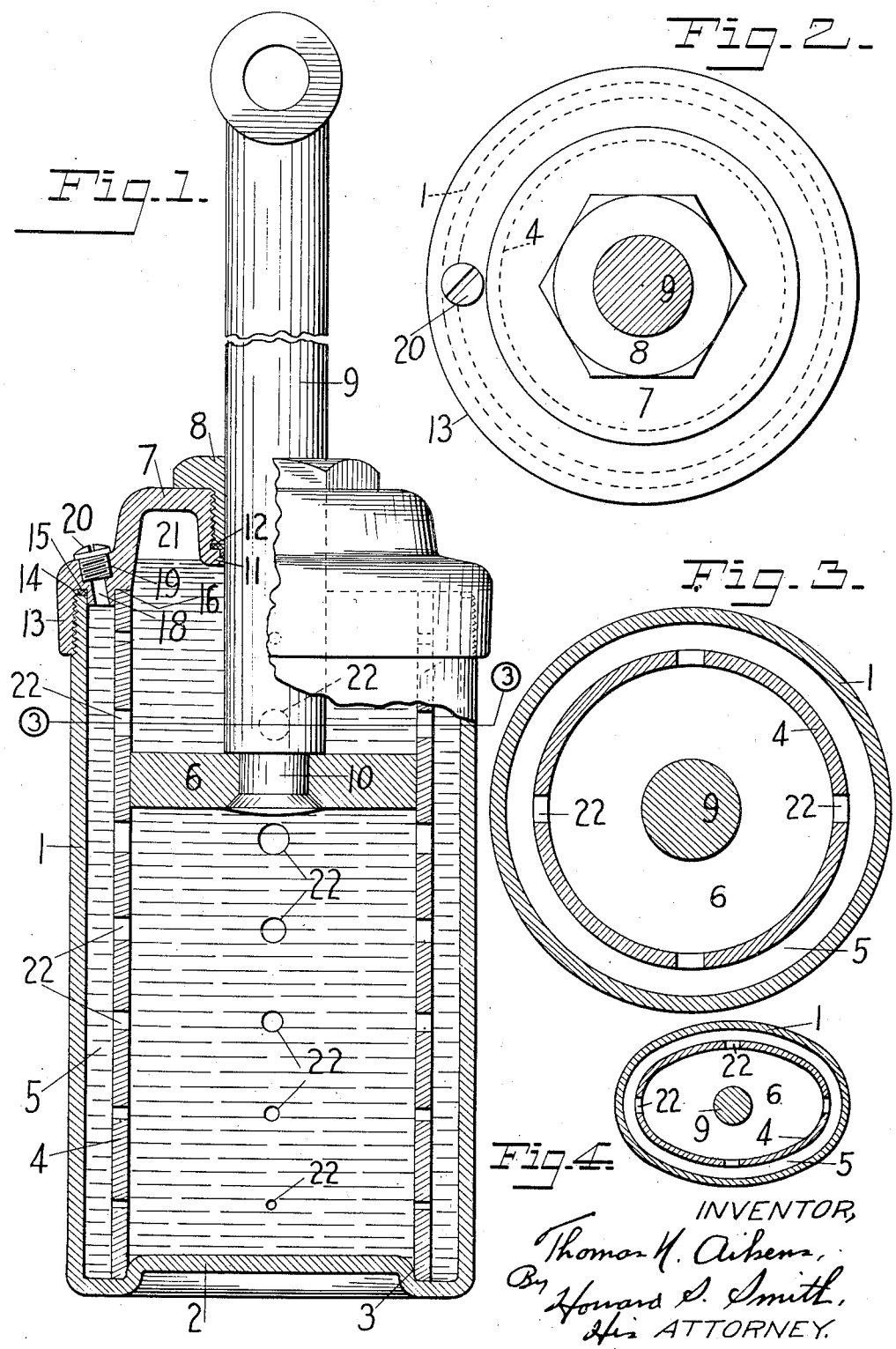

1,658,962

UNITED STATES PATENT OFFICE.

THOMAS N. AIKENS, OF OAKWOOD, OHIO.

HYDRAULIC SHOCK ABSORBER.

Application filed May 10, 1924. Serial No. 712,263.

This invention relates to new and useful improvements in hydraulic shock absorbers, and more particularly to a shock absorber in which a graduated fluid resistance is offered to the recoil or shock.

It is one of the principal objects of my invention to provide a simple and cheaply manufactured shock absorber which tends to make the driving of an automobile safe, its steering easier and its riding qualities better by effectively absorbing the shocks to which it is subjected. The more severe the shock, the greater will be the resistance offered to it by a fluid below the piston in a chamber by providing in the wall of the latter a number of holes graduated in size. Near the end of the descent of the piston there are no more holes in the chamber wall through which the fluid may escape, so that it may form a cushion for the piston before the recoil begins.

It is another object of my invention to provide in the head or cover of the chamber a pocket to receive the fluid displaced by the piston rod during the descent of the piston.

It is still another object of my invention to make my hydraulic shock absorber from few parts to cheapen the cost of its manufacture. The outer casing may be made from a single stamping if desired, and many of its other parts may be economically produced to lessen its cost.

In the accompanying drawings, Figure 1 is a longitudinal, sectional view taken through my shock absorber. Figure 2 is a top plan view of the same. Figure 3 is a cross sectional view taken through my shock absorber on the line 3—3 of Figure 1. And Figure 4 is a cross sectional view taken through my shock absorber when constructed in elliptical form.

Referring to the accompanying drawings for a detailed description of my invention, the numeral 1 designates an outer casing which may be of any suitable shape in cross section. In Figures 1, 2 and 3 I have shown the outer casing to be cylindrical in cross section, and elliptical in Figure 4. However, I prefer a cylindrical outer casing 1 formed with an integral bottom 2 which is inwardly pressed around a circular line a short distance from its outer end to provide an inwardly projecting annular shoulder 3. Fitted over the latter is an inner chamber such as the cylinder 4 which projects upwardly to the top of the outer casing 1, leaving between the latter and itself an annular channel or space 5 which acts as a bypass for a fluid, preferably oil, around a piston 6 reciprocable within the inner cylinder.

The top part of the outer casing 1 is preferably externally threaded to receive an internally threaded, flanged head or cover 7 having a central hole to receive a bush nut 8 through which a rod 9 passes. This rod has a reduced portion 10 which is tightly fitted in a central hole in the piston 6 and peened over it. Formed at the bottom of the central hole in the bush nut 8 is a step-shaped shoulder or ledge 11 against which an annular gasket 12, angular in cross section, is pressed by the nut to prevent the leakage of fluid past the piston rod.

The cover or head 7 is formed at its outer end with an annular internally threaded flange 13 to screw on the externally threaded top part of the casing 1. The top of the latter extends into a recess 14 formed in the cover against a gasket 15 constructed of leather or other suitable material to prevent the leakage of oil out of the channel 5. The top of the cylinder 4 fits into a shoulder notch 16 formed in the inner surface of the cover 7 a short distance from the recess 15. Between the recess and the notch there is thus formed on the inner surface of the head 7, an annular spacer projection 17 between the upper ends of the inner cylinder 4 and the outer casing 1.

Projecting inwardly through this spacer projection 17 is a fluid inlet bore 18 that communicates with an enlarged counter-bore 19 which is threaded to receive a screw plug 20 which, when removed, permits oil to be poured into the channel 5.

Formed in the head 7 around its middle portion, is an annular recess or pocket 21, the outer boundary wall of which extends down to the shoulder notch 16 which receives the upper end of the inner cylinder 4. This pocket is adapted to receive the fluid displaced by the downwardly moving piston rod 9.

Normally the piston 6 occupies the position in the inner cylinder, shown in Figure 1. Below and above the piston when in that position, the inner cylinder 4 is formed with circularly arranged holes 22 of any suitable number which are graduated to decrease in size from the piston in each direction. When the fluid is poured through the filler opening 19 into the space 5 between the inner cylinder and the outer casing, it will flow through the holes 22 into the inner cylinder on both sides of the piston 6 to the level shown in Figure 1. Above this level the fluid cannot rise without flowing out of the filler opening 19. Therefore, at this level of the fluid, there will be sufficient space left above it in the pocket 21 to receive the fluid displaced by the piston rod 9 when the latter moves downwardly.

When a vehicle in which my shock absorber is mounted, is subjected to a sudden shock, the piston will be forced downwardly, through its connection with the axle or frame of the vehicle (not shown), against the fluid below it in the inner cylinder 4. This fluid when pressed upon by the downwardly descending piston, will escape through the graduated holes 22 in the cylinder wall, into the space 5 between the latter and the outer casing 1. Through this space or channel 5 the fluid will then be bypassed around the piston into the upper part of the inner cylinder 4, through the holes 22 in the latter above the piston.

Since the holes 22 in the cylinder wall are graduated to decrease in diameter below the normal position of the piston in the cylinder, the piston will meet with increased fluid resistance during its descent. Should the descent be sudden, as in response to a violent shock, the greater will be the resistance offered by the fluid to the piston, for it will move quickly to the region where the holes 22 through which the fluid may escape, are very small. Near the end of its downward stroke, there are no holes through which the fluid may escape, whereupon the fluid below the piston will form a cushion for it before the rebound. Then, when the piston passes its normal position on the recoil, the gradually decreasing holes above that position of the piston will offer an increasing resistance to its rebound movement. Since the holes in the cylinder wall increase in size from the lowermost position of the piston to its initial or normal one, the piston will move quickly to that position, after which the fluid, finding it more difficult to escape through the holes which decrease in size upward, will act as a snubber to arrest the rebound of the piston in the same manner that its descent is arrested at the lower end of the cylinder.

It will now be seen that my shock absorber is so constructed as to cause the fluid to act as an equalizer of the shock on both sides of the piston. I have also provided a shock absorber which may be economically manufactured, for it may be made from few parts, many of which are stampings. An easy and efficient bypass for the fluid around the piston is provided by the channel 5 to which the fluid is admitted through the holes that are graduated to decrease in size on both sides of the piston when in its normal position. Furthermore, the pocket 21 provided in the head or cover 7 of the casing affords an adequate storage space for the fluid which the piston displaces during its downward movement. All of these features, together with others hereinbefore pointed out, make my shock absorber one which not only eases the riding qualities of the vehicle equipped with it, but one which makes its driving safer and its steering easier.

Having described my invention, I claim:

1. A hydraulic shock absorber comprising an outer casing and an inner chamber disposed within the latter to form between it and said casing an annular bypass channel, and a piston reciprocable within the inner chamber, the latter containing holes graduated to decrease in size on both sides of the piston when in its normal position, to admit fluid to said channel, said holes extending to a point a short distance from the end of the piston stroke.

2. A hydraulic shock absorber comprising an outer casing and an inner cylinder disposed within the latter to form between it and said casing an annular bypass channel, and a piston reciprocable in said inner cylinder, the latter containing holes in its curved wall that decrease in diameter below the normal position of the piston and extending downwardly to a point just above the lowermost position of the piston in the cylinder.

In testimony whereof I have hereunto set my hand this 6th day of May, 1924.

THOMAS N. AIKENS.